Patented May 1, 1934

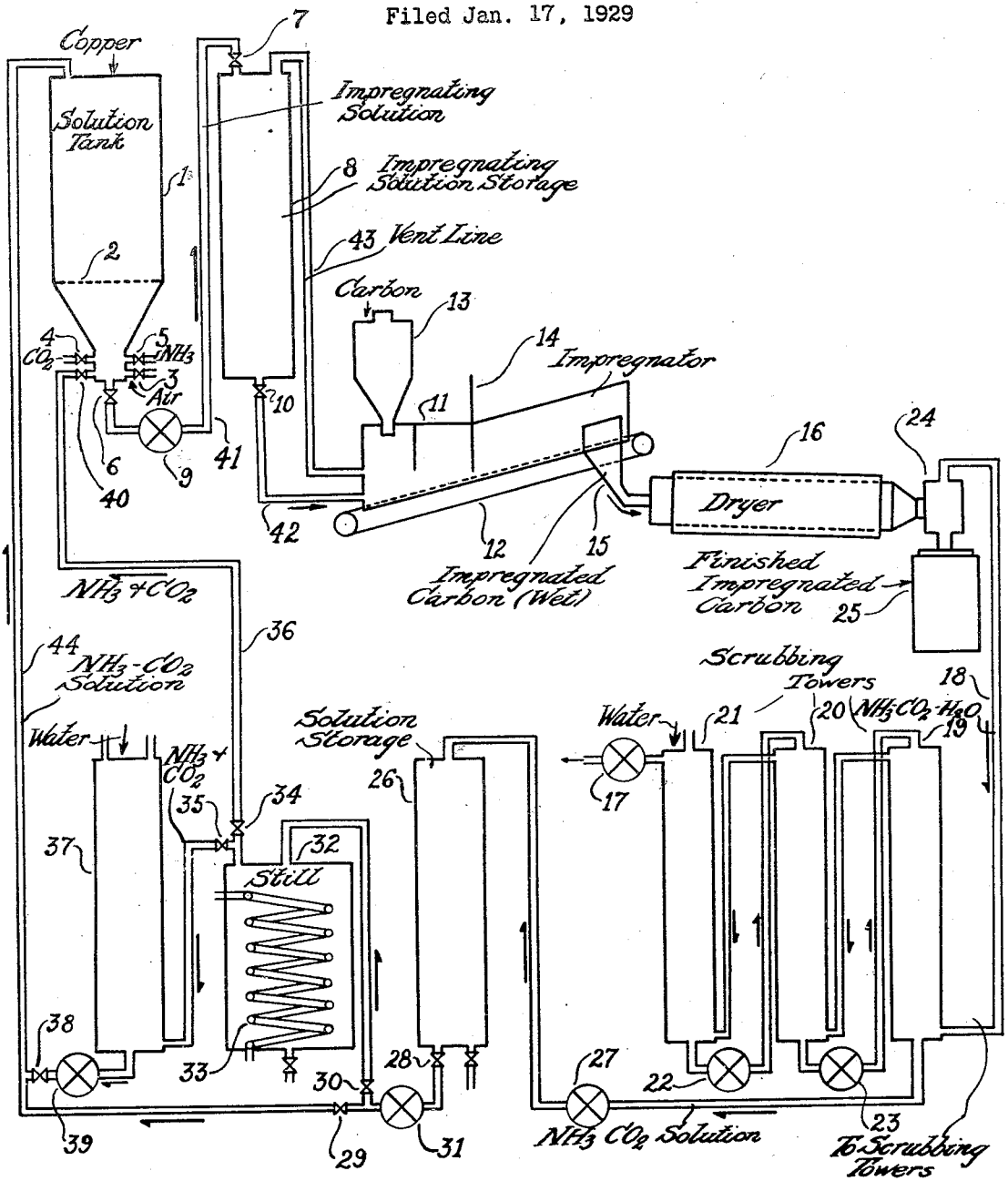

1,956,585

UNITED STATES PATENT OFFICE 1,956,585

METHOD OF PREPARING A CATALYST

Nicholas E. Oglesby and Howard V. Wright, Edgewood, Md.; said Oglesby assignor to said Wright Application January 17, 1929, Serial No. 333,194

17 Claims. (Cl. 23—233)

(Granted under the act of March 3, 1883, as amended April 30, 1928; 370 O. G. 757)

This invention described herein may be manufactured and used by or for the Government for government purposes, without the payment to us of any royalty thereon.

This invention relates to catalysis and more particularly to a method of preparing certain metals and metallic oxides, such as copper, nickel, cobalt, zinc, and similar metals and their oxides, in a form suitable for use as catalysts.

It is common practice, when using metals and metallic oxides as catalytic agents, to employ some porous material as a carrier of the catalyst. The purpose of the material used as a carrier is to support the finely divided catalyst in such a way as to allow intimate contact between it and the materials entering into the reaction. Since the value of a catalyst in many cases depends largely upon the amount of surface exposed to the reacting materials, it is desirable to have the catalyst in as finely divided a state as possible. This condition is usually obtained by impregnating the carrier with a water solution of a suitable salt of the metal and then decomposing the salt, usually by heat. This treatment yields a catalyst either in the form of the metal or an oxide of the metal which, if desired, can then be reduced to the metallic state.

This method of preparation, while yielding a somewhat satisfactory product for use in catalysis, is subject to certain disadvantages. The salts usually employed in the above process are the sulfate and the nitrate. A relatively high temperature is required to decompose both of these salts, which is a material portion of the cost of the catalyst. The use of high temperatures also results, with some metals, in a decreased activity of the catalyst. Preparation of metallic salts by the use of nitric and sulfuric acids necessitates the use of special acid resisting equipment which adds to the cost of production of the catalyst. As the acid products obtained by the decomposition of these salts are highly corrosive, there arises the problem of the disposal of these products which involves difficulties and expense.

For some reactions a metallic oxide catalyst is more effective than the metallic catalyst. In case a carbonaceous carrier such as charcoal is used, the nitrate method cannot be readily employed on a large scale to prepare a metallic oxide catalyst, because of the reducing action of the carbon at the temperature of decomposition of the metallic nitrates. When metallic nitrates are decomposed in the presence of carbon, there is a considerable evolution of heat, making the reaction quite difficult to control.

In order to make the preparation of catalysts economically successful it is important to recover for further use the valuable materials used in the process. In the case of the nitrate method mentioned, this means the recovery of the oxides of nitrogen evolved in the decomposition of the nitrate. When a nitrate is decomposed with heat the nitrogen is evolved as a mixture of $NO_2$, NO, $N_2O$ and free nitrogen. Only the $NO_2$ and the NO can be readily recovered for further use, and the $N_2O$ and free nitrogen are usually lost. In heating activated carbon impregnated with copper nitrate this loss amounts to between 30 and 40% of the nitrogen present in the copper nitrate and is an important item in the cost of the catalyst. The recovery of $NO_2$ and NO necessitates the use of acid resisting equipment. Also the oxidation of the NO present in the mixture to $NO_2$ and the absorption of $NO_2$ in water to form nitric acid involve a number of operating and mechanical difficulties which decrease still further the economy of recovery of nitrogen, or nitrogen compounds.

It can readily be seen that the difficulties connected with the use of nitrates in preparing metallic catalysts make the process a costly one. The use of sulphates in place of nitrates has been attempted in order to reduce the cost of the catalyst. Sulphates are less costly than nitrates, and, because of the low cost of $H_2SO_4$, it is usually considered cheaper to use fresh acid than to attempt the recovery of the $SO_3$ and $SO_2$ evolved in decomposing the sulphate. However, sulphur trioxide and even sulphur dioxide are corrosive gases and must, in large scale operations, be absorbed or neutralized before they can be disposed of finally. In most cases it is necessary to heat the sulphates to 600° C.–900° C. in order to decompose them. These extreme temperatures add to the cost of equipment and to the cost of production of the catalyst. These high temperatures also often materially decrease the activity of many of the catalytic substances and when activated carbon and similar substances are used as carriers a considerable portion of the carrier is destroyed during the heating.

An object of this invention is to provide a method of preparing metallic and metallic oxide catalysts which will be free from the disadvantages inherent in the processes now commonly used in the industry.

Another object of this invention is to provide a method of preparing catalysts by depositing metallic compounds on a carrier and reducing the deposited compounds at low temperatures.

Another object of this invention is to provide a method of preparing catalytic material from metallic compounds that are more easily reduced than those compounds heretofore used in the preparation of catalysts.

Still another object of this invention is to provide a method of preparing catalytic material from ammoniacal metallic compounds.

With these and other objects in view which may be incident to our improvements, the invention consists in the method of preparing catalysts to be herein set forth and claimed, with the understanding that the several necessary steps comprising the invention may be accomplished in any order found most suitable for carrying the same into practical effect, and it is apparent that other compounds and elements may be substituted for those enumerated, and similar formations effected without departing from the spirit of the invention and the scope of the appended claims.

Our invention comprises the use of ammoniacal solutions of metallic salts for the impregnation of carriers for supporting catalytic material and the treatment of the impregnated carrier to reduce the ammoniacal-metallic compounds to make them available as catalysts, together with the recovery of ammonia during the treating process.

In order to make our invention more clearly understood, we have shown in the accompanying drawing a diagrammatic showing of means for carrying the same into practical effect without limiting the improvements in their useful applications to the particular arrangement which, for purposes of explanation, has been made the subject of illustration.

In the drawing:

The figure shows a diagrammatical representation of an arrangement of apparatus suitable for carrying out our process for preparing catalytic material.

It has long been known that ammonia forms a series of complex compounds with certain metals, such as, for example, copper, nickel, and cobalt. These compounds are easily broken down at a relatively low temperature into ammonia and the metal itself or its oxide. The recovery of the ammonia evolved in the decomposition may be accomplished without difficulty by absorbing it in water. Since the metals which form these complex compounds are among those commonly used as catalysts, the use of their ammoniacal solutions to obtain the desired degree of dispersion in the carrier is a marked improvement over the methods which have been used previously for this purpose. According to our invention solutions of copper, nickel, zinc, and cobalt may be prepared by dissolving these metals and/or their oxides, in ammonium hydroxide in the presence of air. These solutions can then be used to impregnate charcoal and other inert carriers for catalytic purposes.

The exact structure of the complex compounds of ammonia, and the metals previously mentioned is not of particular importance in the preparation of catalysts by this method and will therefore not be discussed. A large number of such compounds have, however, been isolated and studied by those skilled in the art. All of these compounds possess the property of being easily decomposed at relatively low temperatures, which is an essential property required in our method of preparing catalysts.

Ammoniacal solutions of copper may be prepared by treating the metal and also its oxides with ammonia in the presence of water, air, and carbon dioxide. By this method it is possible to readily secure a much higher concentration of the metal in solution than is obtained without the use of carbon dioxide.

All of the compounds formed by the methods used have the common property of being easily decomposed when heated to relatively low temperatures. In no case is it necessary to heat the material to a temperature higher than 150° C., in order to liberate the $NH_3$, $CO_2$ and $H_2O$, and leave only the metallic oxide. We wish it to be clear, however, that higher temperatures may be employed particularly when the catalyst is desired in the metallic form. The valuable materials used in preparing the solution of the metal, $NH_3$, and $CO_2$, and liberated by heating are very easily recovered for further use by absorption in water. The solution thus obtained is suitable without further treatment for dissolving more of the catalytic metal. If the metal is desired as a catalyst, instead of its oxide, reduction of the oxide may be effected by any of the usual methods.

As an example, an ammoniacal solution containing 3.4% copper was prepared by allowing ammonium hydroxide to trickle over copper turnings, at the same time passing a current of air through the turnings. One hundred and fifty parts of this solution were used to impregnate 25 parts of charcoal by allowing the solution to flow over the charcoal contained in a tower, until the charcoal had absorbed as much of the copper as possible. The impregnated charcoal was heated at 150° C. until all ammonia had been driven off and was then analyzed for copper. The analysis showed 4.12% copper present in the charcoal in the form of copper oxide.

As an example of the use of carbon dioxide to increase the ease of dissolving; a solution as described above was prepared except that a mixture of carbon dioxide and air was passed through the copper turnings while the ammonium hydroxide was flowing thereover. By this method a solution containing 10.2% copper was obtained. When ammoniacal solutions of copper were prepared without the use of carbon dioxide, it was found that solutions containing more than 3.5% copper tended to decompose on standing, depositing copper oxide. When carbon dioxide was used in preparing the solution, no decomposition was apparent even in solutions containing as much as 10% copper.

Various solutions prepared by the above methods were used to impregnate such inert materials as pumice and kieselguhr with results comparable to those obtained when charcoal was used. Recovery of the ammonia and carbon dioxide evolved in the decomposition of the ammoniacal solution was obtained by absorbing it in water and the solutions thus obtained were used in dissolving additional metals.

Our process of impregnating charcoal with copper and copper oxide may be carried out in an arrangement of apparatus such as is diagrammatically shown in the accompanying drawing.

To start the operation of impregnating inert material with copper, the tank 1 is filled with a solution of ammonium hydroxide. This solution quite often contains between 5 and 10% ammonia, although the concentration is not important since more ammonia may be added later in the process. Metallic copper in the form of lathe turnings, copper sheets, copper scale, or any other form of copper or copper oxides, in which a considerable surface is exposed to the action of the solution is then placed in the tank and is supported therein on the perforated screen 2. Air, carbon dioxide, and ammonia are then admitted through the valves 3, 4, and 5 respectively and bubbled into the solution in the tank. Copper is dissolved by the combined action of these agents.

When the desired concentration of copper is obtained, the valves 6 and 7 are opened and the solution is forced through conduit 41 into the tank 8 by means of the pump 9. From the tank 8 the solution containing the dissolved copper flows by gravity through the valve 10 and conduit 42 into the impregnator 11. The latter is provided with suitable means for maintaining a constant level of the impregnating solution therein. Conduit 43 serves as a vent to permit the maintenance of a constant level in the tank 11.

An endless conveyor belt 12 of suitable material is mounted in the inclined impregating tank 11 for continuously removing the impregnated material from the solution. The inert material to be impregnated, as for example, activated carbon, or other porous material flows continousuly to the impregnator through the hopper 13 at the same rate that the impregnated material is removed by the conveyor belt. An adjustable baffle plate 14 regulates the depth of the layer of the material being carried from the impregnator.

From the conveyor the impregnated material is discharged through the hopper 15 into the rotary dryer 16. The latter may be of any desired construction and may be heated either externally or internally to the desired temperature by any suitable heating medium. This dryer serves to drive off the ammonia, carbon dioxide, and water vapor from the impregnated material. These evolved gases are drawn from the dryer by the suction pump 17 through the vapor line 18 into the scrubbing towers 19, 20, and 21. These towers are of a constructional type suitable for absorbing vapors in a liquid, and may be provided with packing material which offers a large surface for increasing the absorption of the gases or vapors. Water is introduced into the last tower 21 and is circulated, countercurrent to the flow of gases, through the towers 20 and 19 by means of the pumps 22 and 23, and absorbs the gases as it flows over the tower packing. The impregnated material in the dryer 16, from which the ammonia, carbon dioxide, and water have been evolved is discharged through the discharging device 24 into the container 25.

The solution of ammonia and carbon dioxide from the absorbing tower 19 is pumped into the storage tank 26 by the pump 27. By opening valves 28 and 29 and closing valve 30 the solution may be pumped through conduit 44 directly into tank 1 by means of the pump 31, for dissolving additional copper. If further concentration is desired, this solution may be pumped into the still 32, by closing valve 29 and opening valves 28 and 30. The solution pumped into the still 32 is heated by steam coil 33 and the dissolved ammonia and carbon dioxide are driven off. By opening valves 34 and 40 these gases may be led through the pipe 36 directly into tank 1 and absorbed in the solution for dissolving additional copper. If not needed for this purpose they may be led into the tank 37 by closing valve 34 and opening valve 35. The tank 37 is kept full of water in which the ammonia and carbon dioxide are absorbed. By this latter procedure a concentrated solution of ammonia and carbon dioxide can be obtained in the tank 37 which may, by opening valve 38, be forced by the pump 39 into the tank 1 for dissolving additional copper.

By the above method of operation practically all of the ammonia and carbon dioxide used for dissolving the copper is recovered for further use. If additional carbon dioxide is needed it may be introduced into the system by passing the same into tank 1 through valve 5. When the rotary dryer is heated with products of combustion, the latter may be treated by passing through towers 19, 20 and 21 to obtain carbon dioxide which may be used in the dissolution process. Any ammonia lost in the recovery system can be compensated for by introducing additional ammonia gas from cylinders into the tank 1.

If catalysts containing nickel, cobalt, zinc or other metals capable of forming complex ammonia compounds are desired the same can be prepared by the above outlined method with slight variations of certain steps to meet the individual characteristics of the particular metal used.

When our process is carried out, as outlined above, either metals or metallic oxides can be converted into ammino salt solutions which may be used to impregnate porous material. The porous material containing the ammino salt can be treated at, below, or above 150° C. to reduce the ammino salt to either the metallic oxide or to the metal in metallic form, depending upon the requirements of the particular reaction for which the catalyst is to be used.

Thus it can be seen that our invention provides a novel method of preparing catalytic material from metals or metallic oxides capable of forming ammino salts with ammonia. Our invention also makes it possible to impregnate material such as activated carbon with a solution of a salt containing the desired catalyst and reduce the salt to the desired catalytic form without impairing the properties of the supporting material.

Although we have shown and described the preferred embodiment of our invention, we wish it to be understood that we do not confine ourselves to the precise details of compounding herein set forth, by way of illustration, as it is apparent that many changes and variations may be made therein by those skilled in the art, without departing from the spirit of the invention or exceeding the scope of the appended claims.

We claim:

1. A method for preparing catalytic material comprising treating finely divided metallic particles with an ammoniacal solution while injecting carbon dioxide into the solution to form metallic ammonia compounds.

2. A method of preparing catalytic material comprising treating metallic copper or copper oxide with an ammoniacal solution, while injecting carbon dioxide into the solution, impregnating porous material with the solution formed, heating the impregnated material to a temperature sufficient to reduce any metallic compounds to the metallic state but insufficient to disintegrate the porous material.

3. A method of preparing catalytic material comprising treating metallic copper or copper oxide with an ammoniacal solution, while injecting carbon dioxide into the solution, impregnating porous material with the solution formed, heating the impregnated material to a temperature sufficient to decompose the metallic ammoniacal salt formed to the oxide state, but not to the metallic state.

4. A method of preparing catalytic material, comprising treating copper or copper oxide with ammoniacal solutions while injecting carbon dioxide therein to form complex ammonia compounds, impregnating porous material with said compounds, heating said impregnated porous material to decompose the complex ammonia compounds to the oxide state, and absorbing any vapors liberated during said decomposing step and heating the absorbents to a temperature sufficient to drive off said absorbed vapors.

5. A method of preparing catalytic material, comprising treating copper or copper oxide with ammoniacal solutions while injecting carbon dioxide therein to form complex ammonia compounds, impregnating porous material with said compounds, heating said impregnated porous material to decompose the complex ammonia compounds to a metallic state, and absorbing any vapors liberated during said decomposing step and heating the absorbents to a temperature sufficient to drive off said absorbed vapors.

6. A process of preparing catalytic material comprising dissolving a metal whose atomic weight is between fifty-eight and sixty-six in an ammoniacal solution while injecting carbon dioxide therein and decomposing the compound formed into a metallic oxide.

7. A process for preparing catalytic material comprising dissolving copper or copper oxide in an ammoniacal solution, while injecting carbon dioxide in the solution, and decomposing the ammoniacal complex formed by heat.

8. A process for preparing catalytic material comprising dissolving nickel in an ammoniacal solution, while injecting carbon dioxide in the solution, and decomposing the ammoniacal complex formed by heat.

9. A process for preparing catalytic material comprising dissolving zinc in an ammoniacal solution, while injecting carbon dioxide in the solution, and decomposing the ammoniacal complex formed by heat.

10. A process of preparing catalytic material comprising dissolving a metal of the group consisting of copper, nickel, cobalt, and zinc or the oxide thereof in an ammoniacal solution while injecting carbon dioxide therein, and decomposing the compound formed into a metallic oxide.

11. A process of preparing a catalytic material comprising dissolving a metal of the group consisting of copper, nickel, cobalt, and zinc or the oxide thereof in an ammoniacal solution in the presence of at least five per cent carbon dioxide, and decomposing the ammonia complex by heating.

12. A process of preparing a catalytic material comprising treating finely divided particles of a metal of the group consisting of copper, nickel, cobalt, and zinc or the oxide thereof with an ammoniacal solution while injecting at least five per cent carbon dioxide to form complex ammonia compounds of the metal, impregnating charcoal with this compound, and decomposing the compound by heat.

13. A process of preparing a stable ammoniacal metal complex which will not decompose on standing comprising treating a metal of the group consisting of copper, nickel, cobalt, and zinc or the oxide thereof with an ammonia compound in the presence of at least five per cent carbon dioxide.

14. A process of preparing a catalyst which comprises treating a metal from the group consisting of copper, nickel, cobalt, and zinc or the oxide thereof with an ammonia solution in the presence of carbon dioxide to form a complex ammonia compound of the metal, impregnating a porous carrier with this compound, and then decomposing the ammonia complex by heating to a temperature of the order of 150° C.

15. A process of preparing a catalyst wherein at least seven percent of a metal or its oxide is impregnated in a carrier which comprises treating a metal from the group consisting of copper, nickel, cobalt, and zinc or the oxide thereof with an ammonia solution while injecting carbon dioxide therein to form a complex ammonia compound of the metal, impregnating a carrier with this compound, and decomposing the ammonia complex by heating to a temperature of the order of 150° C.

16. A method of preparing catalytic material comprising treating a metal of the group consisting of copper, nickel, cobalt, and zinc or the oxide thereof with an ammoniacal solution in the presence of carbon dioxide to form an ammino-salt solution, impregnating porous material with said solution, and subjecting said treated material to heat for decomposing the ammino salt, absorbing the gases liberated during the solution formed to form further ammino-salt solutions.

17. A method of preparing catalytic material comprising treating a metal of the group consisting of copper, nickel, cobalt, and zinc or the oxide thereof with an ammoniacal solution in the presence of carbon dioxide to form an ammino-salt solution, impregnating porous material with said solution, and subjecting said treated material to heat for decomposing the ammino salt, absorbing the gases liberated during said decomposing process to form a solution, treating the solution to drive off the absorbed ammonia, and introducing the ammonia evolved into the ammino-salt forming solution.

NICHOLAS E. OGLESBY.
HOWARD V. WRIGHT.